Patented Jan. 20, 1953

2,626,286

UNITED STATES PATENT OFFICE 2,626,286

PRODUCTION OF AROMATICS AND SATURATED ALIPHATICS

Alexis Voorhies, Jr., and Clark E. Adams, Baton Rouge, La., assignors to Standard Oil Development Company, a corporation of Delaware No Drawing. Application December 28, 1949, Serial No. 135,534

18 Claims. (Cl. 260—668)

This invention relates to a novel chemical process for preparing relatively pure aromatic compounds and relatively pure saturated compounds by transfer of hydrogen from a naphthenic compound to carbon to carbon multiple bonds over an activated carbon catalyst under selective, critical conditions.

This type of hydrogen transfer differs completely from ordinary hydrogenation in that the catalyst used, that is, activated carbon, is usually not a good catalytic hydrogenation catalyst and branched chain olefins are preferentially saturated over straight chain olefins, whereas the opposite is usually true of ordinary hydrogenation.

In the type of simple hydrogen transfer with which our case is concerned, it has been observed that the naphthenic component is not dehydrogenated over an activated carbon catalyst in the absence of the olefinic constituent. The olefinic constituent may be hydrogenated over activated carbon in the absence of the naphthenic constituent, but only if a portion of it is first polymerized and then aromatized by dehydrogenation to yield hydrogen for subsequent reaction with the olefin. Molecular hydrogen has no effect on a hydrogen transfer reaction of the type herein described, an indication that the hydrogenation portion of the hydrogen transfer is not of the conventional type.

The reaction disclosed in this case is intermolecular and does not depend upon a rearrangement or preliminary reaction of either of the constituents prior to the transfer reaction. So-called hydrogen transfer reactions of the prior art between olefins and paraffins which have been said to occur over cracking catalysts appear to be more complex and to involve a polymerization of at least a part of the olefin, followed by aromatization through loss of hydrogen. The simple inter-molecular hydrogen transfer between naphthenes and olefins over activated carbon herein described is therefore unique, novel, and not previously described.

The process of this invention is especially applicable to catalyzed reactions in which hydrogen is directly transferred between compounds of the naphthenic class and unsaturated hydrocarbon compounds capable of saturation at multiple bonds, both double and triple. The process is well suited, for example, for the conversion of simple olefins from $C_2$ to $C_{10}$ to the corresponding saturated hydrocarbons using the hydrogen which has been removed from a naphthenic compound. The reaction is carried out in the vapor phase with the use of an activated carbon catalyst.

The use of the selective activated carbon catalyst results in much greater selectivities to the desired materials and a great diminution in undesirable degradation reactions.

Naphthenes can be defined as saturated compounds of the general formula $C_nH_{2n}$ having closed rings composed of methylene groups. The naphthenic hydrocarbons that may be employed as hydrogen donors are preferably those having six cyclic carbon atoms, i. e., cyclohexane and its derivatives. Naphthenic rings having four or less carbon atoms are too unstable to work satisfactorily. Alkylated derivatives of these naphthenes, such as methylcyclohexane, can also be employed. The naphthenes are dehydrogenated during the course of the reaction to aromatic type products. When cyclohexane is converted to benzene, any olefins which may be present simultaneously undergo hydrogenation with no appreciable degradation to unwanted materials.

A typical reaction between the naphthenes and olefinic compounds is illustrated by the reaction between one molecule of cyclohexane and three molecules of ethylene:

(1)
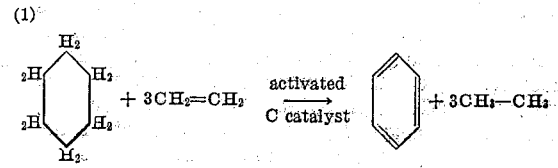

A second example of the reaction is reaction between one molecule of methylcyclohexane and three molecules of isobutylene to give toluene and isobutane as the products:

(2)
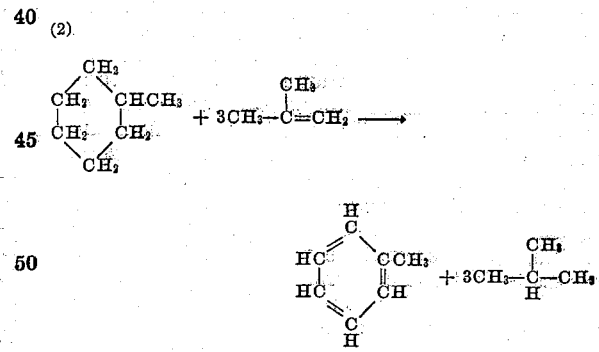

As a third example of the invention, the reaction between methylcyclohexane and 2-butene may be shown:

(3)

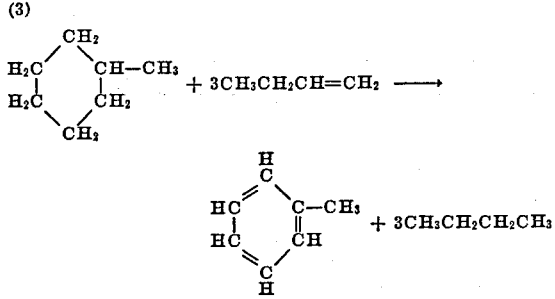

The hydrogen atoms are thus removed from the naphthenes and these atoms are catalytically utilized to add to the carbon to carbon unsaturated bond of the olefinic starting component. Cyclohexane and its higher homologues are particularly adapted for use in the process of this invention because the removal of six hydrogen atoms from cyclohexane converts it to the completely aromatized benzene.

The reaction is carried out in vapor phase in the presence of a catalyst of the activated carbon type and under conditions of temperature, pressure, feed rates, and the like, so chosen as to produce the desired extent of conversion and at same time obtain selectivity and relatively pure products. The equipment employed for this purpose may be of any type known to those skilled in the art for effecting a vapor phase catalytic reaction. Thus, for example, liquid feed is charged to a vaporizer from which the resulting feed vapors pass through a preheating zone and thence into the reaction zone in which the vapors are contacted with the catalyst. The effluent vapors from the reaction zone are cooled and condensed to produce a liquid reaction product and non-condensible gases.

A large variety of mono-, di-, and polyolefin materials can be used as hydrogen acceptors in this selective hydrogen transfer process. Materials having acetylenic bonds can also be used, although these materials when used in thermal and catalytic reactions present explosive hazards and may require critical control and adjustment of conditions to give satisfactory results. Among these multiple bond compounds which may be used are ethylene, propylene, 1-butene, 2-butene, isobutylene, acetylene, vinyl acetylene, stryrene, butadiene, isoprene, and various vinyl ring compounds.

The use of this highly selective hydrogen transfer reaction has a number of important advantages. For instance, this method is useful to selectively aromatize the naphthenic compounds and at the same time to convert olefins to saturated compounds. This conversion can be done under relatively mild conditions and in the absence of free hydrogen, thus representing a convenient method for obtaining both the aromatics and the saturates as relatively pure chemical entities. Olefins are available as undesirable substituents in gasoline and fuel products.

From a study of the data obtained from many experimental runs, it can be seen that one potentially great advantage which resides in this process is that the conversion of olefins to saturates can be expected as is indicated without any substantial isomerization of the olefin chain compounds. Where a large excess of olefin is present during the hydrogen transfer reaction, a small amount of isomerization has been found to take place. Since the isoolefins are more or less selectively hydrogenated over the normal olefins, the method can be adjusted to be effective as a separation and isolation method for hydrocarbon type isomers. It is also considered to be within the scope of this invention to add to or use in conjunction with the activated carbon catalyst an additional catalyst to cause at least a partial isomerization of a relatively straight chain feed stock to isoolefins in case isoparaffins are preferred products.

Such selectivity which is achieved by this process cannot readily be obtained in any other hydrogenation method. For example, catalytic hydrogenation using free hydrogen and a hydrogenation catalyst is not at all selective and uses generally, a catalyst such as nickel or supported nickel, both of which are much less rugged and durable in nature.

It is an especial advantage of the hydrogen transfer process using an activated carbon catalyst that there are a minimum of side reactions. For instance, under optimum conditions, substantially no cracking or gas formation takes place to give breakdown or decomposition products of the naphthenic compound or of the olefinic material and a minimum of polymerization of the reactants and reaction products to give higher molecular weight condensed materials and tarry by-products.

The catalyst which has been found to be particularly useful in carrying out the reaction is activated carbon, since this gives a minimum of degradative cracking reactions to gaseous products and coke. The activated carbon is derived from a variety of sources, including vegetable matter decomposition products, lignite, petroleum sources, bituminous coal, or selected pure organic compounds. The catalyst should have a very high surface area and a relatively low content of volatile material. The amount of surface area is considered to be directly related to the catalytic activity. A suitable carbon catalyst for this conversion is of coal origin and has a very high surface area of the order of 1000 to 1100 square meters per gram of catalyst. When the catalyst is in use and is being slowly deactivated, the surface area is actually decreased because the pores of the carbon become filled with organic deposits. In order to reactivate the catalysts, these deposits must be removed. This removal is accomplished by a reactivation procedure. The activated carbon catalyst is regenerated by stripping with inert gases such as steam, nitrogen, flue gases, etc. at elevated temperatures, i. e., 1350°–1600° F. A preferred method for regeneration of the carbon catalyst is treatment at around 1500° F. with steam. It is also possible, at least to some extent, to burn the deposits from the inactivated catalysts but this must be done under carefully controlled conditions in order not to destroy the carbon catalyst itself at the same time.

The reaction mixture is taken from the catalytic reaction zone and preferably condensed to a liquid comprising reaction product and non-condensible gases. The liquid reaction product is worked up in any suitable manner, for example, by fractionation, adsorption, or crystallization to recover both the aromatic and saturated hydrocarbon constituents of the feed in the requisite degree of purity. Unchanged or incompletely converted reactants may be recycled together with fresh feed. If desired, an inert diluent such as, for example, a portion of the non-condensible gaseous products may be employed. It is also possible to recycle one of the products as a diluent. While there is no necessity for a diluent, the use of such an inert material may be desirable to effect more efficient and simpler control of the reaction.

It will be understood that the exact conditions employed in carrying out the reaction will be determined by the nature of the feed constituents, the desired conversions per pass and the exact catalyst employed. The reaction may be carried out under pressures ranging from sub-atmospheric to super-atmospheric as long as it is carried out in the vapor phase. However, it is best to maintain the operating conditions such that atmospheric pressures may be employed.

In general, the range of temperatures for carrying out the reaction will be of the order of 750°–1100° F. Optimum temperatures for the reaction are considered to be 900°–1000° F. At temperatures below this range, the rate of reaction tends to become impracticably slow whereas at temperatures higher than this range there is an increased tendency towards the occurrence of side reactions such as thermal cracking, gas formation, polymerization, and other undesirable reactions. The total feed rates employed will lie in the range of 0.1 to 10 liquid volumes per valume of catalyst per hour. It is considered that the contact time may be relatively short, such as 0.1 to 1 second, particularly to achieve optimum selectivity and satisfactory conversion. The proportion of hydrogen donor to hydrogen acceptor in the feed may likewise be varied over a wide range. Generally, it will lie between one to ten and five or ten to one parts by weight.

The relative concentrations of the naphthenes to the olefinic compounds in the feed varies with the results desired. Thus, high conversion per pass of naphthenes to aromatics can be obtained by the use of a feed ratio of 1 part naphthenes to 3 parts olefins, the stoichiometric equivalents. On the other hand, an excess of naphthenic compound tends to enhance the yield of saturated products from the olefin. The feed materials may be used in a relatively pure form or can be used diluted as found in various refinery sources. These refinery source streams are frequently most conveniently and economically employed.

The process may be executed in a batch, intermediate, or continuous manner. Higher conversions are obtained with multi-pass processes. The catalyst may be employed in a fixed bed, moving bed or in a fluidized manner, depending on the type of operation desired.

This invention will be better understood by reference to the following examples and tables, indicating the results obtained from the reaction of various naphthenes and olefinic compounds. The results reported were obtained after a single-pass operation unless otherwise specified.

EXAMPLE I

The experiments were carried out in a general way by passing the liquid feed comprising the appropriate mole ratio of naphthene and olefin through a vaporizer and preheater to vaporize the feed and bring it to the desired temperature. The heated feed vapor was then contacted with the activated carbon catalyst bed at the temperatures and feed rate conditions specified by the data of the tables. The resulting products were condensed and analyzed to find the approximate distribution of naphthenes and aromatics. The catalytic activity of activated carbon is compared with the activity of other catalysts for hydrogen transfer from methylcyclohexane to butene-2 in Table I.

These data show activated carbon is superior to catalysts composed of $SiO_2$ and $Al_2O_3$ as well as to hydroforming catalysts of $MoO_3$ and $Al_2O_3$ for hydrogen transfer in both activity and selectivity. The hydroforming catalyst was largely ineffective for hydrogen transfer under these conditions. The formation of a high ratio of iso- to n-paraffins shows the isomerizing action of the silica-alumina catalyst while activated carbon gave essentially no isomerization. Using an inert packing, there was negligible reaction of the feed under these conditions. Silica gel and alumina containing small amounts of silica were largely inactive for hydrogen transfer.

EXAMPLE II

Data shown in Table II below show a slightly enhanced hydrogen transfer when using isobutene compared with n-butene under similar conditions.

*Table I.—Comparison of various catalysts for hydrogen transfer from naphthenes to olefins*

| Catalyst | 200 cc. Catalyst vol., atm. pressure—0.5 v. v. hr. methylcyclohexane | | | | | | |
|---|---|---|---|---|---|---|---|
| | Inert | $SiO_2$—$Al_2O_3$ | $MoO_3$—$Al_2O_3$ | Silica gel | 5% $SiO_2$ on $Al_2O_3$ | 11.7% $SiO_2$ on $Al_2O_3$ | Act. C |
| Run No. | 92 | 93 | 95 | 116 | 141 | 142 | 104 |
| Moles $C_4H_8$-2/mole methylcyclohexane | 2.3 | 2.6 | 2.4 | 3.15 | 2.8 | 2.9 | 2.5 |
| Hours run | 5 | 5 | 5 | 5 | 2.5 | 2.5 | 4 |
| Block temp., °F | 949 | 950 | 949 | 952 | 945 | 950 | 945 |
| Catalyst temp., °F | 950 | 954 | 920 | 937 | 925 | 934 | 974 |
| Wt. percent gas ($C_3$—) | 0.3 | 8.3 | 1.6 | 0.2 | | | |
| Wt. percent carbon | | 1.6 | 2.3 | 0.0 | 0.9 | 2.2 | 0.9 |
| Percent conv. $C_4H_8$ | 0 | 49.9 | 5.0 | 1.9 | 0.7 | 7.2 | 60.9 |
| Percent selec. to n-$C_4H_{10}$ | | 14.3 | 93.7 | 93.1 | | 44.4 | 98.3 |
| Percent selec. to iso-$C_4H_{10}$ | | 23.4 | 6.3 | 6.9 | | 17.4 | 0.1 |
| Percent conv. methylcyclohexane | 8.8 | 18.0 | 17.7 | 8.2 | 25.7 | 24.7 | 65.5 |
| Percent selec. to aromatics [1] | 0 | 45.9 | 51.3 | 0.0 | 25.0 | 42.8 | 77.5 |

[1] Figures assuming naphthenes and aromatics in $C_5+$ product are all methylcyclohexane and toluene, respectively.

Table II.—Comparative reactivity of iso- and N-olefins

| $C_4$ gas | Act. C catalyst; atm. pressure; 0.5 v./v./hr. methylcyclohexane | | |
|---|---|---|---|
| | i-$C_4H_8$ | n-$C_4H_8$-2 | n-$C_4H_8$-2 |
| Run No., ECT- | 103 | 104 | 102 |
| Moles olefin/moles methylcyclohexane | 3.0 | 2.5 | 0.6 |
| Hours run | 5 | 4 | 5 |
| Block temp., °F | 953 | 945 | 949 |
| Catalyst temp., °F | 998 | 974 | 939 |
| Wt. percent gas ($C_3$—) | 1.7 | 2.5 | 1.9 |
| Wt. percent carbon | 0.9 | 0.9 | 0.4 |
| Percent conv. $C_4H_8$ | 64.1 | 60.9 | 98.4 |
| Percent selec. to n-$C_4H_{10}$ | 1.7 | 98.3 | 107 |
| Percent selec. to i-$C_4H_{10}$ | 100 | 0.1 | 0.9 |
| Percent conv. methylcyclohexane [1] | 73.9 | 65.5 | 35.4 |
| Percent selec. to aromatics [1] | 79.5 | 77.5 | 74.5 |

[1] Approximate figures assuming naphthenes and aromatics in $C_6+$ product are all methylcyclohexane and toluene, respectively.

One indication of the greater reactivity of isobutene over butene-2 is the occurrence of a more exothermic reaction when feeding isobutene as shown by the increase in catalyst temperature over the block temperatures during the reaction period.

These data indicate that in hydrogen transfer reactions of the type herein described, branched chain olefins are more readily saturated than are straight chain olefins. The reverse of this is true in ordinary hydrogenation reactions.

When the mole ratio of olefin to naphthene is lowered from the stoichiometric (3:1) there is an increased conversion of the olefin as shown by a comparison of Runs 102 and 104, presented in Table II above. Under these conditions the conversion of naphthene fed is also lowered, however, since less olefin is available as an acceptor for hydrogen transfer.

EXAMPLE III

The product distribution obtained feeding a stoichiometric mixture of methylcyclohexane and isoheptene ($C_7$ cut of an olefinic polymer) over activated carbon is compared in Table III with that obtained feeding a similar mixture of methylcyclohexane and normal heptane used for a control. It is especially notable that the yield of aromatics obtained in the presence of the iso-olefin was appreciably more than with the paraffin indicating hydrogen transfer and the necessity for an olefinic material for good results. However, the yield of aromatics in the presence of the paraffin was higher than would be expected with methylcyclohexane alone, probably due to the hydrogen exchange with degradation products from the cracking of the normal heptane.

Table III.—Hydrogen transfer reactions effect of feed composition on product distribution

| | 200 cc. activated carbon catalyst, feed rate 1 v./v./hr., 75 p. s. i. g. press. | |
|---|---|---|
| Run No | 85 | 86 |
| Feed comp., weight percent. | 73.7% iso-$C_7H_{14}$ [1]; 26.3% methylcyclohexane. | 72.5% n-$C_7H_{16}$; 27.5% methylcyclohexane. |
| Avg. cat. temp., °F | 1,061 | 1,043. |
| Product comp., weight percent output: | | |
| C | 5.18 | 1.55. |
| $H_2$ | 0.19 | 0.34. |
| $CH_4$ | 8.53 | 5.55. |
| $C_2H_4$ | 0.86 | 0.74. |
| $C_2H_6$ | 6.70 | 6.09. |
| $C_3H_6$ | 2.20 | 1.59. |
| $C_3H_8$ | 7.43 | 6.63. |
| i-$C_4H_8$ | 2.28 | 0.57. |
| n-$C_4H_8$-1 | 0.68 | 0.58. |

Table III.—Hydrogen transfer reactions effect of feed composition on product distribution—Con.

| | 200 cc. activated carbon catalyst, feed rate 1 v./v./hr., 75 p. s. i. g. press. | |
|---|---|---|
| Run No | 85 | 86 |
| Product comp., weight percent output: | | |
| n-$C_4H_8$-2 | 1.49 | 1.06. |
| i-$C_4H_{10}$ | 6.22 | 2.53. |
| n-$C_4H_{10}$ | 3.43 | 6.11. |
| $C_5H_{10}$ | 3.97 | 2.14. |
| i-$C_5H_{12}$ | 6.51 | 2.79. |
| n-$C_5H_{12}$ | 1.38 | 3.34. |
| $C_6+$ | 43.00 | 58.43. |
| Aromatics, weight percent. | 74.5 | 35. |
| Olefins, weight percent. | 12.0 | 0. |

[1] $C_7$ cut made by U. O. P. polymerization of $C_3$-$C_4$ olefin stream.

EXAMPLE IV

Data reported in Table IV below was obtained as described in the examples above, using the specific conditions of the table. It is to be noted that, comparatively speaking, isobutylene reacts more readily in hydrogen transfer reactions over activated carbon than does n-butene-2.

Table IV.—Hydrogen transfer reactions between methylcyclohexane and butenes over activated carbon catalyst; 950° F.; Atm. pressure

| | |
|---|---|
| Methylcyclohexane feed, v./v./hr. | 0.5 |
| Moles olefin [1]/moles methylcyclohexane | [1] 5.71 |
| Mole per cent conversion $C_4H_8$ | 24.5 |
| Per cent selectivity n-$C_4H_{10}$ | 34.1 |
| Per cent selectivity iso-$C_4H_{10}$ | 65.9 |
| Methylcyclohexane conversion | 58.2 |
| Per cent selectivity to aromatics | 60.6 |

[1] Nearly a twofold excess of an equimolar mixture of 2-butene and isobutene.

EXAMPLE V

As a specific example of the temperature effects, Table V shows that an increase in the catalyst temperature from 974° to 1078° F. as in Runs 104 and 91, increased the conversion of both the butene-2 and methylcyclohexane fed.

The increased conversion of the olefin at the higher temperature is mainly accounted for, however, by the greater formation of gas.

Table V.—Effect of varying temperature with activated carbon catalyst

| | Act. C Catalyst, 0.5 v./v./hr. methylcyclohexane; ca. 2.4 mole $C_4H_8$-2/mole methylcyclohexane, atm. press. | |
|---|---|---|
| Run No | 91 | 104 |
| Block temp., °F | 1,048 | 945 |
| Catalyst temp., °F | 1,078 | 974 |
| Hours run | 5 | 4 |
| Weight percent gas ($C_3$—) | 14.4 | 2.5 |
| Weight percent carbon | 1.2 | 0.9 |
| Percent conversion $C_4H_8$ | 72.6 | 60.9 |
| Percent selec. n-$C_4H_{10}$ | 79.3 | 98.3 |
| Percent selec. i-$C_4H_{10}$ | 1.8 | 0.1 |
| Percent conv. methylcyclohexane [1] | 91.4 | 65.5 |
| Percent selec. aromatics [1] | 78.8 | 77.5 |

[1] Approximate figures assuming naphthenes and aromatics in $C_6+$ product are all methylcyclohexane and toluene, respectively.

EXAMPLE VI

Table VI shows the hydrogen transfer reaction proceeds only in the presence of naphthene, olefin and activated carbon. It does not occur with either component when passed alone over activated carbon or when both components are used in the absence of activated carbon but in the presence of an inert.

*Table VI*

| Catalyst | Activated Carbon | | | | | | Inert |
|---|---|---|---|---|---|---|---|
| Temp., °F | 950 | 950 | 950 | 928 | 950 | 974 | 950 |
| Feed | Methylcyclohexane | Methylcyclohexane.[1] | Methylcyclohexane + $C_2H_4$ | Methylcyclohexane + $N_2$ | $C_4H_8$-2 | Methylcyclohexane + $C_4H_8$-2 | Methylcyclohexane + $C_4H_8$-2 |
| Liquid feed rate, v./v./hr | 0.5 | 1.0 | 0.5 | 0.5 | | 0.5 | 0.5 |
| Gas feed rate, v./v./hr | | 360 | 300 | 309 | 138 | 241 | 222 |
| Mole ratio, gas/methylcyclohexane | | 1.83 | 3.11 | 3.20 | | 2.5 | 2.3 |
| Percent conversion, methylcyclohexane | 34.3 | 10.1 | 55.7 | 5.1 | | 65.5 | 8.8 |
| Percent conversion, olefin | | | 53.1 | | 60.1[2] | 60.9[3] | 0 |
| Toluene selectivity, mol percent on methylcyclohexane | None | None | 97.8 | 41.3 | | 77.5 | 0 |

[1] $CO_2$ gas used as an inert diluent.
[2] 37.1% coke made, remaining conversion ascribed to polymerization and hydrogen transfer from hydrogen produced during coking.
[3] 98.4% selectivity to butanes with only 0.9 weight percent coke found.

EXAMPLE VII

The data shown in Table VII are results obtained when various olefins are used with methylcyclohexane in hydrogen transfer reactions over an activated carbon catalyst. The use of ethylene, propylene, and 2-butene gives high selectivities to the corresponding paraffins and, at the same time, gives good yields of aromatics from methylcyclohexane.

*Table VII.—Effect of varying the olefin reactant*

| | Act. C catalyst; 950° F.; 0.5 v./v./hr. methylcyclohexane; 300 v./v./hr. olefin; approx. 3 mole olefin/mole methycyclohexane | | |
|---|---|---|---|
| Run No | 1 | 2 | 3 |
| Olefin | $C_2H_4$ | $C_3H_6$ | $C_4H_8$-2 |
| Methylcyclohexane conversion, mole percent | 55.7 | 64.4 | 68.7 |
| selectivity to aromatics, mole percent | 97.8 | 74.0 | 76.2 |
| Olefin conversion, mole percent | 53.1 | 53.8 | 72.5 |
| selectivity to paraffin, mole percent | 90.6 | 99.6 | 71.5 |

EXAMPLE VIII

Table VIII presents data showing the results obtained from hydrogen transfer reactions between a naphthene and isohexene, using an activated carbon catalyst at temperatures of about 840° F. These results indicate the process to be an attractive one for converting this type of feed mixture to aromatics and $C_6$ saturates with very little degradation and gas or carbon formation.

*Table VIII.—Hydrogen transfer reactions between methylcyclohexane and isohexene*

| | 200 cc. fixed bed activated carbon catalyst, atm. pressure | | |
|---|---|---|---|
| Run No | 1773-3 | 1773-4 | 1530-3 |
| Avg. block temp., °F | 843 | 843 | 840 |
| Avg. cat. temp., °F | 853 | 860 | 853 |
| Catalyst type | Act. C | Act. C | Act. C |
| Feed rate, v./v./hr | 0.38 | 0.37 | 1.20 |
| Feed ratio: Moles methylcyclohexane/Moles $C_6H_{12}$* | 1:1 | 1:3 | 1:1 |
| Material balance, weight percent | 96.5 | 96.5 | 93.7 |
| Product distribution (output basis): | | | |
| Carbon, weight percent | 1.2 | 7.2 | 0.0 |
| Gas $C_3-$, weight percent | 3.8 | 7.6 | 1.4 |
| $C_4$, weight percent | 2.0 | 3.7 | 2.0 |
| $C_5$, weight percent | 0.9 | 2.5 | 0.7 |
| $C_6+$, weight percent | 92.1 | 79.0 | 95.9 |
| | 1:1 methylcyclohexane: $C_6H_{12}$ mixed feed | 1:3 methylcyclohexane: $C_6H_{12}$ mixed feed | |
| Calculated: | | | |
| Weight percent olefins | 46 | 68 | 8 |
| Weight percent aromatics | 19 | 25.0 | 13 |
| Weight percent naphthenes | 54 | 32 | 41 |
| Olefin conversion, mole percent | 98.0 | 96.8 | 83 |
| Aromatic yield, mole percent methylcyclohexane | 32.4 | 75.0 | 25 |

*$C_6$ cut prepared by U. O. P. polymerization of $C_3$ olefin fraction.

EXAMPLE IX

The results obtained feeding mixtures of methylcyclohexane and $C_6$ olefin at about 950° F. over varying catalysts, are summarized below in Table IX.

*Table IX.—Hydrogen transfer reactions using feed mixture of methylcyclohexane and $C_6$ olefin [1]*

| | Atm. pressure; 1.2 v./v./hr., 2 hr. runs | | |
|---|---|---|---|
| Avg. block temp., °F | 944 | 944 | 944 |
| Catalyst | 87% $SiO_2$— 13% $Al_2O_3$ | Act. C | Act. C |
| Run No | 32-2 | 32-4 | 32-3 |
| Avg. catalyst temp., °F | 940 | 945 | 940 |
| Mole methylcyclohexane/$C_6H_{12}$ | 1:3 | 1:3 | 1:1 |
| Products (output basis): | | | |
| Weight percent carbon | 5.9 | 5.1 | 0.7 |
| Weight percent gas ($C_3-$) | 23.7 | 9.3 | 5.9 |
| Weight percent $C_4$ | 17.0 | 9.9 | 6.0 |
| Weight percent $C_5$ | 8.1 | 5.2 | 3.1 |
| Weight percent $C_6+$ | 45.3 | 70.5 | 84.3 |
| $C_6+$ product (output basis): | | | |
| Weight percent olefins | 11 | 15 | 2 |
| Weight percent aromatics | 25 | 25 | 22 |
| Weight percent naphthenes | 37 | 8 | 30 |
| Percent olefin conv | 93 | 85 | 96 |
| Percent selec. to saturates | 18 | 58 | 86 |
| Percent methylcyclohexane conv. | 40 | 80 | 53 |
| Percent selec. to aromatics | 110 | 85 | 70 |

[1] $C_6$ olefin cut prepared by U. O. P. polymerization of $C_3$ olefin fraction.

Here, too, as when the butenes are fed as the olefin, the activated carbon is shown to be more active and selective than is a mixed $SiO_2$-$Al_2O_3$ catalyst. The theoretical yield of aromatics from methylcyclohexane, by hydrogen transfer with the olefin fed, is 33% with an equimolar feed mixture and this yield is approached with the activated carbon catalyst. The conversion of methylcyclohexane and yield of aromatics increases for activated carbon at 950° F. Appreciable cracking of olefin is, however, evident at this temperature and indicates that substantially higher temperatures are to be avoided.

EXAMPLE X

The results obtained by lowering the feed rate using mixtures of methylcyclohexane and isohexene over an activated carbon catalyst at 850° F., are presented in Table X. These data obtained by feeding the stoichiometric mixture of 3 moles isohexene to 1 mole methylcyclohexane indicate that increased conversion of olefin and higher yields of aromatics accompanied by increased gas and carbon formation are obtained using 0.4 V/V/Hr. as compared with results from 1.2 V/V/Hr. feed rate. These reaction conditions gave an olefin conversion of 97% and an aromatic yield of 75.0% with 79 wt. per cent recovery of $C_6+$ product when feeding the stoichiometric mixture of olefin and naphthene.

*Table X.—Effect of varying the feed rate in hydrogen transfer reactions using an activated carbon catalyst—Atm. pressure, 2-Hr. run.*

| Feed rate, v./v./hr | 1.19 | 0.37 |
|---|---|---|
| Catalyst | Act. C | Act. C |
| Avg. catalyst temp., °F | 855 | 860 |
| Coke, weight percent out | 3.2 | 7.2 |
| Gas ($C_3-$), weight percent out | 1.6 | 7.6 |
| $C_6+$, weight percent out | 90.7 | 79.0 |
| Olefin conv., mole percent | 75 | 97 |
| Aromatic yield, mole percent | 16 | 75 |

EXAMPLE XI

It is also possible to prepare aromatics and saturates by this hydrogen transfer reaction using an activated carbon catalyst by feeding a dilute mixture of refinery streams containing naphthenes and olefins. Materials which do not react merely function as diluents in the catalytic reaction zone. Results obtained from using diluted streams are reported below in Table XI. These experiments were carried out in substantially the same way as were those of previously described catalytic hydrogen transfer reactions using activated carbon. In these experiments, an equivolume mixture of narrow cut virgin naphthenic naphtha and light naphtha from catalytic cracking containing olefins, are reacted under hydrogen transfer conditions, the naphthenes in the virgin naphtha being converted to aromatics while olefins in the cracked naphtha are hydrogenated to saturated compounds. Varying temperatures were studied to determine the optimum operating conditions.

*Table XI.—Use of diluted stream feeds for hydrogen transfer reactions over activated carbon catalyst*

| | Activated carbon catalyst; 2 hour runs; atm. pressure; 1.2 v./v./hr. equivolume mixture of a virgin naphthenic naphtha fraction (B. P. 224°/256° F.) and depentanized light cracked naphtha [1] (B. P. 133°/204° F.) | | | | |
|---|---|---|---|---|---|
| Temperature, °F | 839 | 900 | 951 | 1,000 | 1,046 |
| Yields (weight percent input): | | | | | |
| Liquid product collected | 96.2 | 92.5 | 89.0 | 78.3 | 53.5 |
| Gas, total | 0.17 | 3.41 | 5.66 | 17 | 37 |
| $C_4$ | 0.00 | 0.55 | 0.96 | | |
| $C_5+$ | 0.09 | 1.39 | 2.48 | | |
| Carbon | 0.6 | 0.6 | 0.6 | | |

| FEED | | | | | |
|---|---|---|---|---|---|
| Liquid product insp.: | | | | | |
| Bromine No | 43 | 24 | 24 | 17 | 27 | 27 |
| Percent olefins | 27 | 14 | 15 | 10 | 18 | 18 |
| Percent aromatics | 6 | 9 | 10 | 15 | 22 | 41 |
| Percent naphthenes | 19 | 17 | 10 | 6 | 0 | 0 |
| Percent acyclics | 75 | 74 | 80 | 79 | 78 | 59 |
| Octane No.[2] +4 cc. tetraethyl lead | 86 | | 88.0 | 88.0 | 89.6 | 90.0 |

[1] This light cracked naphtha contained quite appreciable amounts of olefinic compounds.
[2] A. S. T. M. aviation octane number.

These data show that the optimum results are obtained at temperatures between 900° and 1000° F. Little reaction takes place below 900° F., and above 1000° F. appreciable cracking is encountered. A significant improvement in the aviation gasoline quality, as indicated by increase in octane number, is shown for the hydrogen transfer reaction of these two streams over activated carbon catalyst.

What is claimed is:

1. A method for simultaneously effecting the catalytic dehydrogenation of naphthenes to aromatics and the catalytic hydrogenation of olefins to paraffins which comprises simultaneously contacting a gaseous stream containing naphthenes and a gaseous stream containing olefins with an activated carbon catalyst at temperatures of 750° to 1100° F., whereby hydrogen is transferred directly from the naphthene to the olefin to produce an aromatic hydrocarbon and a paraffin therefrom with a minimum amount of degradation of reactants to gaseous and carbonaceous byproducts.

2. A method for simultaneously effecting the catalytic dehydrogenation of naphthenes to aromatics and the catalytic hydrogenation of olefins to paraffins which comprises reacting in the vapor phase a gaseous mixture of naphthenes and olefins in the presence of an activated carbon catalyst at temperatures of 900°–1000° F., whereby hydrogen is transferred directly from the naphthene to the olefin to produce an aromatic hydrocarbon and a paraffin therefrom with a minimum amount of degradation of reactants to gaseous and carbonaceous by-products.

3. A method such as that described in claim 2 in which there is used about one mole of naphthenes and about three moles of olefins.

4. A method such as that described in claim 2 in which the naphthenes are essentially cyclohexanes.

5. A method for simultaneously effecting the catalytic dehydrogenation of naphthenes to aromatics and the catalytic hydrogenation of olefins to paraffins which comprises contacting in vapor phase a mixture consisting substantially of naphthenes and olefins with a solid catalyst consisting essentially of activated carbon at temperatures of 750°–1100° F. and atmospheric pressure, whereby hydrogen is catalytically transferred directly from the naphthenes to the olefins to produce aromatics and paraffins therefrom.

6. A method such as that described in claim 5 in which the olefins used are essentially of the iso structure.

7. A method such as that described in claim 5 in which the naphthenes used are essentially cyclohexanes.

8. A method such as that described in claim 5 in which there is used about one mole of naphthenes and about three moles of olefins.

9. A method for the simultaneous production of aromatics and paraffins which comprises reacting in vapor phase a mixture consisting essentially of naphthenes and olefins in the presence of an activated carbon catalyst at temperatures of 900°–1000° F. under hydrogen transfer conditions so that the hydrogen split off from the naphthenes combines directly with the olefins, thereby producing aromatics and paraffins.

10. A method such as that described in claim 9 in which the contact time of the vaporous reactants with the catalyst is from 0.1 to 1 second.

11. A method for the simultaneous production of toluene and a paraffin which comprises reacting methylcyclohexane and an olefin in the vapor phase in the presence of a catalyst consisting essentially of activated carbon at temperatures of from 900°–1000° F. under conditions of hydrogen transfer so that hydrogen split off from the methylcyclohexane combines directly with the olefin, thereby producing toluene and the corresponding paraffin.

12. A method such as that described in claim 11 in which the temperature is about 950° F.

13. A method such as that described in claim 12 in which the olefin used is butene-2.

14. A method such as that described in claim 12 in which the olefin used is isobutene.

15. A method such as that described in claim 12 in which the olefin used is an isohexene.

16. A method for the simultaneous production of toluene and a paraffin which comprises a mixture containing about one mole of methylcyclohexane and about three moles of olefin in the vapor phase with an activated carbon catalyst at temperatures of 900°–1000° F., so that hydrogen split off from the methylcyclohexane combines directly with the olefin, thereby producing toluene and the corresponding paraffins with a minimum amount of degradation of reactants to gaseous and carbonaceous by-products.

17. A process such as that described in claim 16 in which the contact time of the mixture of reactants with the catalyst is from 0.1 to 1 second.

18. A method for the production of a hydrocarbon stream containing substantial amounts of aromatics and paraffins which comprises contacting a mixture of dilute hydrocarbon streams of petroleum origin and containing substantial amounts of naphthenes and olefins, in the vapor phase with a catalyst consisting essentially of activated carbon at temperatures of 900°–1000° F. under conditions of hydrogen transfer so that hydrogen split off from the naphthenes combines directly with the olefins, thereby producing aromatics and the corresponding paraffins with a minimum amount of degradation of reactants to gaseous and carbonaceous by-products.

ALEXIS VOORHIES, JR.
CLARK E. ADAMS.

REFERENCES CITED

The following references are of record in the file of this patent:

UNITED STATES PATENTS

| Number | Name | Date |
|---|---|---|
| 1,913,941 | Mittasch et al. | June 13, 1933 |
| 2,052,917 | Bergstrom et al. | Sept. 1, 1936 |
| 2,241,393 | Danner | May 13, 1941 |
| 2,400,363 | Meier | May 14, 1946 |
| 2,426,870 | Hill | Sept. 2, 1947 |

OTHER REFERENCES

Berkman et al., Catalysts, Reinhold Pub. Corp (1940), p. 815.